US009564819B2

(12) United States Patent
Wang et al.

(10) Patent No.: US 9,564,819 B2
(45) Date of Patent: Feb. 7, 2017

(54) SWITCHING POWER SUPPLY CIRCUIT

(71) Applicant: TDK Corporation, Minato-ku, Tokyo (JP)

(72) Inventors: YueQing Wang, Shanghai (CN); Honglei Wang, Shanghai (CN)

(73) Assignee: TDK Corporation (JP)

( * ) Notice: Subject to any disclaimer, the term of this patent is extended or adjusted under 35 U.S.C. 154(b) by 0 days.

(21) Appl. No.: 14/669,532

(22) Filed: Mar. 26, 2015

(65) Prior Publication Data

US 2016/0079870 A1    Mar. 17, 2016

(30) Foreign Application Priority Data

Sep. 15, 2014   (CN) .......................... 2014 1 0469608

(51) Int. Cl.
*H02M 3/335* (2006.01)
*H02M 3/28* (2006.01)

(52) U.S. Cl.
CPC ......... *H02M 3/33546* (2013.01); *H02M 3/285* (2013.01); *H02M 3/33592* (2013.01)

(58) Field of Classification Search
CPC .............. H02M 3/285; H02M 3/33546; H02M 3/33592
See application file for complete search history.

(56) References Cited

U.S. PATENT DOCUMENTS

| | | | | |
|---|---|---|---|---|
| 2004/0252526 A1* | 12/2004 | Amei | .................. | H02M 3/3381 363/18 |
| 2005/0152158 A1* | 7/2005 | Gut | .................. | H02M 3/33592 363/16 |
| 2005/0207188 A1* | 9/2005 | Takashima | .............. | H02M 1/08 363/21.14 |
| 2005/0231984 A1* | 10/2005 | Wang | ................ | H02M 3/33576 363/16 |
| 2010/0182807 A1* | 7/2010 | Miyamoto | ........ | H02M 3/33592 363/21.14 |

FOREIGN PATENT DOCUMENTS

| | | |
|---|---|---|
| JP | 2002-345239 A | 11/2002 |
| JP | 2003-164146 A | 6/2003 |
| JP | 2003-284336 A | 10/2003 |
| JP | 2006-246625 A | 9/2006 |
| JP | 2007-074812 A | 3/2007 |

* cited by examiner

*Primary Examiner* — Jessica Han
*Assistant Examiner* — Bart Iliya
(74) *Attorney, Agent, or Firm* — Harness, Dickey & Pierce, P.L.C.

(57) ABSTRACT

A switching power supply device includes: a transformer; a first switch connected between a high potential terminal of an input DC voltage source and a primary winding; a second switch connected between a low potential terminal of the input DC voltage source and a primary winding; a control circuit outputting a driving pulse signal for synchronizing the first and second switches; first and second rectifying devices; a synchronous rectifier circuit; and a positive bias circuit that applies a positive bias to a control terminal of one of the first and second switches so as to constantly turn the one of the first and second switches ON. When the first and second switches stop a switching operation while an output voltage exists between the output terminals, the positive bias circuit applies the positive bias to the one of the first and second switches.

4 Claims, 7 Drawing Sheets

SWITCHING POWER SUPPLY CIRCUIT

CROSS-REFERENCE TO RELATED APPLICATION

This application claims priority to Chinese Patent Application No. 201410469608.9 filed Sep. 15, 2014 which is hereby expressly incorporated by reference herein in its entirety.

BACKGROUND

The present invention relates to a switching power supply device that has a cascaded forward converter unit and a synchronous rectifier circuit and that can be utilized for various electronic apparatuses. Specifically, the cascaded forward converter unit has a plurality of main switching elements. The synchronous rectifier circuit has a rectifying switch element and a commutation switch element.

In regards to a switching power supply device that has high power, it is important to achieve high efficiency and reduction in heating of components. As a measure for the achievement, because it becomes possible to decrease a switching loss of a main switch when it is turned ON, it is efficient that a switching element such as a MOS-FET (Metal Oxide Semiconductor Field Effect Transistor), which has a large rated current and small ON resistance, is used for the main switch. By the way, in general, it is said that the ON resistance of a MOS-FET increases in proportion to the rise of a withstand voltage to the second to second and half power (2-2.5 power). Therefore, it is necessary to use a MOS-FET that has a withstand voltage as low as possible.

In this regard, because an applied voltage to a main switch becomes half in a steady state and a surge voltage that is generated according to switching is clamped by an input voltage, a cascaded forward converter, in which the MOS-FET having a low withstand voltage can be used, is preferred as a circuit system (refer to Japanese Patent Publication Number 2007-74812 described below).

Further, with respect to a switching power supply device in which an output voltage is low and in which a large current flows, because a synchronous rectifier circuit in which a diode is replaced with a MOS-FET as a rectifying device can decrease conduction loss in a rectifier, it is efficient. Further, because the above configuration has advantages with respect to the heating of components, the above synchronous rectifier circuit is preferred as a circuit system (refer to JP 2007-74812 discussed below). As a synchronous rectification operation of the synchronous rectifier circuit that has a rectifying side MOS-FET corresponding to a rectifying switch element and a commutation side MOS-FET corresponding to a commutation switch element, the rectifying side MOS-FET is turned ON in synchronization with an ON driving signal of a main switch at a primary side. On the other hand, the commutation side MOS-FET is turned ON in synchronization with an OFF driving signal of the main switch at the primary side. As a configuration in which a driving signal of a main switch in an insulated converter is transmitted to a secondary side synchronous rectification part, a separately-excited configuration, in which the signal is directly transmitted via an insulation element such as a pulse transformer and a photocoupler, exists. However, because this configuration (the separately-excited configuration) requires a large number of parts, the circuit is complicated. Further, it is also disadvantageous with respect to a mounting space for components. In contrast, a self-excited configuration, in which the signal is transmitted by using a main winding at a secondary side of a main transformer or a driving winding that is independently provided, exists. Because this configuration (the self-excited configuration) requires a small number of parts, the circuit is relatively simple. Therefore, it is also advantageous with respect to the mounting space (refer to JP 2007-74812 discussed below).

To satisfy the demand for a low voltage and a large current at a load side in a switching power supply device in recent years, in a case in which there is an insufficient output rated current in a single switching power supply device, a plurality of switching power supply devices have been used in parallel.

The present invention is directed to a case in which a plurality of switching power supply devices operate in parallel. The switching power supply device corresponds to a synchronous rectifier circuit in which a DC (direct current)-DC converter unit is a cascaded forward converter unit and in which a rectifier at a secondary side is self-excitedly driven.

FIG. 1 shows a circuit diagram of a conventional switching power supply device that corresponds to a synchronous rectifier circuit in which a DC-DC converter unit is a cascaded forward converter unit and in which a rectifier at a secondary side is self-excitedly driven. An operation according to the conventional switching power supply device is explained below with reference to the circuit diagram of FIG. 1.

In FIG. 1, only the DC-DC converter unit is shown by omitting components of a general switching power supply device in which an input AC (alternating current) voltage is filtered/rectified/smoothed.

In FIG. 1, a main transformer isolates a primary side of the unit from a secondary side of the unit. Further, the main transformer T1 is configured with a primary-side main winding Np, a secondary-side main winding Ns1 and an auxiliary winding Ns2, which drives a commutation side MOS-FET Q4.

The polarities of the primary-side main winding Np, the secondary-side main winding Ns1 and the auxiliary winding Ns2 (in a secondary side) of the main transformer T1 are shown by dots in FIG. 1. Further, phase relations of voltages that are induced at each winding are indicated by arrows in FIG. 1. Main switches Q1 and Q2 correspond to switching elements such as MOS-FETs. The DC-DC converter unit adopts a cascade forward configuration. Therefore, a connection configuration between input DC voltage terminals +Vin and −Vin of an input DC voltage Vin is in the following order: the input DC voltage terminal +Vin on a high potential side, a drain terminal of the main switch Q1, a source terminal of the main switch Q1, a dot mark side of the primary-side main winding Np of the main transformer T1, a non-dot mark side of the primary-side main winding Np, a drain terminal of the main switch Q2, a source terminal of the main switch Q2 and the input DC voltage terminal −Vin on a low potential side. Further, an input capacitor C1 is connected between the input DC voltage terminals +Vin and −Vin.

Further, a cathode of a rectifying device CR2 is connected to the source terminal of the main switch Q1, and on the other hand, an anode is connected to the input DC voltage terminal −Vin on the low potential side of the input DC voltage Vin.

Further, an anode of a rectifying device CR1 is connected to the drain terminal of the main switch Q2, and on the other hand, a cathode is connected to the input DC voltage terminal +Vin on the high potential side of the input DC voltage Vin.

Though descriptions of a detection circuit of an output voltage Vout are omitted in FIG. 1, the detection circuit of the output voltage Vout detects a fluctuation error between a setting voltage and the output voltage Vout and feedbacks the fluctuation error to a control circuit. Further, the control circuit outputs a driving pulse signal that variably controls a time ratio of ON and OFF operations of the main switches Q1 and Q2 so as to correct the fluctuation error. That is, so-called PWM control is performed.

The main switches Q1 and Q2 perform switching operations (ON/OFF operations) in synchronization with each other by inputting the driving pulse signals from the control circuit to each of the control terminals of the main switches Q1 and Q2.

Source potentials of the main switches Q1 and Q2 are different. In this case, the source potential of the main switch Q2 is connected to a GND potential of the control circuit that outputs the driving pulse signal via the input DC voltage terminal −Vin on the low potential side of the input DC voltage Vin. On the other hand, the source potential of the main switch Q1 is connected to the main transformer T1 in which a potential significantly fluctuates by the switching operation. Therefore, the driving pulse signal for the main switch Q1 is isolated in the middle of a transmission path from the control circuit (indicated by dual wavy lines in the diagram) and is floated from the GND potential of the control circuit.

Because the main switches Q1 and Q2 perform the switching operations in synchronization with each other, the input DC voltage Vin is intermittently applied to the primary-side main winding Np of the main transformer T1. On the other hand, in the secondary side of the main transformer T1, a rectification smoothing circuit, which is configured with a rectifying side MOS-FET Q3, the commutation side MOS-FET Q4, a choke coil L1 and a capacitor C3, is connected to the secondary-side main winding Ns1.

A drain terminal of the commutation side MOS-FET Q4 and one end of the choke coil L1 are connected to a terminal on the dot mark side of the secondary-side main winding Ns1. Further, the other end of the choke coil L1 is connected to an output terminal +Vout. On the other hand, a drain terminal of the rectifying side MOS-FET Q3 is connected to a terminal on the non-dot mark side of the secondary-side main winding Ns1. Further, a source terminal of the rectifying side MOS-FET Q3, a source terminal of the commutation side MOS-FET Q4 and an output terminal −Vout are connected to each other. In addition, a capacitor C3 is connected between the output terminals +Vout and −Vout.

When the main switches Q1 and Q2 are turned ON, the input DC voltage Vin is applied to the primary-side main winding Np of the main transformer T1 in the direction of the arrow (the dot side indicates the high potential) shown in FIG. 1. In this case, voltages are respectively generated at the secondary-side main winding Ns1 and the auxiliary winding Ns2 in the direction of the arrow (the dot side indicates the high potential) in the same manner as the above. Specifically, the voltages are in proportion to each turn ratio of a set of the primary-side main winding Np and the secondary-side main winding Ns1 and a set of the primary-side main winding Np and the auxiliary winding Ns2 of the main transformer T1. At the same time, because the voltage that is generated at the secondary-side main winding Ns1 is applied to the gate terminal of the rectifying side MOS-FET Q3 as a positive bias voltage via a capacitor C2 and a resistor R1, the rectifying side MOS-FET Q3 is turned ON. On the other hand, the voltage that is generated at the auxiliary winding Ns2 is a reverse bias voltage for the gate terminal of the commutation side MOS-FET Q4. Therefore, because a gate stored charge of the commutation side MOS-FET Q4 is discharged, the commutation side MOS-FET Q4 is immediately turned OFF.

On the other hand, when the main switches Q1 and Q2 are turned OFF, the input DC voltage Vin that is applied to the primary-side main winding Np of the main transformer T1 is released so that a flowing current Ip is immediately interrupted. Thereafter, as shown in FIG. 2, in the main transformer T1, exciting energy, which is accumulated into an inductance of the main transformer T1 by an excitation current that is obtained by eliminating a transmission electric current to the secondary side from the flowing current of the main transformer T1, is generated at the primary-side main winding Np of the main transformer T1 as a flyback voltage that has an inverted polarity with respect to the polarity of the voltage that is applied when the main switches Q1 and Q2 are turned ON. The flyback voltage described above is clamped by the rectifying device CR1 and a rectifying device CR2, that is by the input DC voltage Vin at most.

In this case, in the same way as the primary-side main winding Np, flyback voltages are respectively generated also at the secondary-side main winding Ns1 and the auxiliary winding Ns2 in a direction (the non-dot side indicates the high potential) opposite to the arrow shown in FIG. 1. A peak value of the flyback voltages are in proportion to the turn ratio of each winding. Because the voltages respectively generated at the secondary-side windings are reversed compared with a case in which the main switches Q1 and Q2 are turned ON, the gate terminal of the rectifying side MOS-FET Q3 becomes in a reverse bias state so that a gate stored charge of the commutation side MOS-FET Q3 is discharged. As a result, the commutation side MOS-FET Q3 is immediately turned OFF. Because the flyback voltage that is generated at the auxiliary winding Ns2 is applied to the gate terminal of the commutation side MOS-FET Q4 as a positive bias voltage via a resistor R2, the commutation side MOS-FET Q4 is turned ON.

As explained above, the rectifying side MOS-FET Q3 and the main switches Q1 and Q2 are turned ON in synchronization with each other. On the other hand, the commutation side MOS-FET Q4 is turned ON in synchronization with the turning OFF state of the main switches Q1 and Q2.

At the primary side, a DC voltage is converted into an AC voltage by chopping the input DC voltage Vin by the main switches Q1 and Q2. Then, the AC voltage is transmitted from the primary-side main winding Np to the secondary-side main winding Ns1 via the main transformer T1. Further, the transmitted AC voltage is rectified by synchronous rectifying MOS-FETs Q3, Q4. Further, the transmitted AC voltage is smoothed by the smoothing circuit that is configured with the choke coil L1 and the capacitor C3. At the time, ON and OFF time ratios (a pulse width) of the main switches Q1 and Q2 are variably controlled so as to obtain a desired DC voltage.

An operation of the smoothing circuit is explained below. The energy transmission via the secondary-side main winding Ns1 is cut off when the main switches Q1 and Q2 and the rectifying side MOS-FET Q3 are synchronously turned OFF. However, energy, which is accumulated into the choke coil L1 (an inductor) during an ON period of the main switches Q1 and Q2 immediately before the cut-off, is continuously supplied to the capacitor C3 and a load via the commutation side MOS-FET Q4 that is shifted to be in an ON state. As a result, the smoothing can be achieved.

The operation of the conventional switching power supply device, in which the DC-DC converter unit adopts the cascade forward configuration and the rectifier at the secondary side corresponds to the synchronous rectifier circuit that is driven by the self-excited configuration, is explained above.

As operating states of the switching power supply device explained above, the following states are typically known: a plurality of switching power supply devices connected in parallel are operated so as to correspond to high power demand; the switching power supply device is operated by connecting a battery as a load; and the switching power supply device is operated in a light-load state including a non-load state by connecting a large capacity capacitor at the load side.

When the switching power supply device, in which the synchronous rectifier circuit that is driven by the self-excited configuration and that is adopted as the rectifier at the secondary side as described in the above background, is under operation in the states explained above and when the main switches stop the switching operations for some reason, the rectifying side MOS-FET and the commutation side MOS-FET alternatively repeat the ON and OFF operations even though the main switches stop. As a result, a self-excited oscillation state can be generated. Specifically, in the self-excited oscillation state, energy is regenerated for an input side of the stopped switching power supply device by the output of the other parallel connected switching power supply devices that are normally operated, by the battery of the load or by the large capacity capacitor at the load side.

As a cause of the stop of the main switches, the following cases are considered: operations of various protection functions such as an overvoltage protection and an heating protection; variation/unevenness of potential differences among the output voltages Vout of the parallel connected power supply devices; a general breakdown; and a stopping operation as a remote control function of the power supply device.

The self-excited oscillation can be generated by a mechanism explained below. There are two modes for the self-excited oscillation. Specifically, a mode 1 is explained with reference to FIG. 2 and a mode 2 is explained with reference to FIG. 3 below.

First of all, both of the main switches Q1 and Q2 or one of them are/is suddenly turned OFF. As a result, flyback voltages are generated at each winding of the main transformer T1 in the direction of the arrows (the non-dot sides indicate the high potentials) shown in FIG. 2. The flyback voltage regenerates energy for the primary side input by the rectifying devices CR1 and CR2 even at this time. Because the gate terminal of the commutation side MOS-FET Q4 becomes in a positive bias state according to the flyback voltage explained above, the commutation side MOS-FET Q4 is turned ON. In this state, when the voltage (an energy source) exists at the output terminal +Vout, an inductor current IL that flows in the choke coil L1 (the inductor) in a direction opposite to the normal operation, i.e., from the side of the current output as shown in FIG. 2. Further, a current Iq4 flows in the commutation side MOS-FET Q4. While a part of the inductor current IL stores energy in the choke coil L1 (the inductor), the inductor current IL increases as time elapses. When the main switches Q1 and Q2 are turned ON, the current flows in the main transformer T1. The flyback voltage is generated by exciting energy that is accumulated into the inductor (the choke coil L1) by an excitation current component. Specifically, the excitation current component is obtained by eliminating the transmission electric current from the current flowing in the main transformer T1. When the exciting energy is consumed and exhausted, the flyback voltage decreases. As a result, the commutation side MOS-FET Q4 is eventually turned OFF (the above explanation is defined as the mode 1).

When the commutation side MOS-FET Q4 is turned OFF, a voltage at a node connected between the drain terminal of the commutation side MOS-FET Q4 and the choke coil L1 (the inductor) increases up to an electrical potential. Specifically, this electrical potential of the increased voltage is obtained by adding the voltage at the output terminal +Vout and an electromotive voltage which is generated by the energy being accumulated into the choke coil L1 (the inductor) during the ON period of the commutation side MOS-FET Q4. Because the increased voltage is the positive bias voltage for the gate terminal of the rectifying side MOS-FET Q3 via a series circuit of the resistor R1 and the capacitor C2, the rectifying side MOS-FET Q3 is turned ON. At the same time, the increased voltage is applied to the secondary-side main winding Ns1 of the main transformer T1 in the direction of the arrow (the dot side indicates the high potential) shown in FIG. 3. Even at this time, the inductor current IL that flows in the choke coil L1 (the inductor) in the direction opposite to the normal operation, i.e., from the side of the current output as shown in FIG. 3. However, because the energy is discharged from the choke coil L1 (the inductor), the inductor current IL decreases as time elapses. Further, a current Iq3 flows in the rectifying side MOS-FET Q3. At this time, a voltage in which a peak value is proportional to the turn ratio between the primary-side main winding Np and the secondary-side main winding Ns1 is generated at the primary-side main winding Np of the main transformer T1 in the direction of the arrow (the dot side indicates the high potential) shown in FIG. 3. Though the main switches Q1 and Q2 are turned OFF, energy regeneration from the secondary-side output to the primary-side input occurs because body diodes inside the main switches Q1 and Q2 are provided in forward directions with respect to the input DC voltage source. Even at this time, the exciting energy is accumulated into the choke coil L1 (the inductor) by an excitation current Ip in the main transformer T1. When the inductor current IL of the choke coil L1 (the inductor) is equal to an excitation current of the secondary-side main winding Ns1 by discharging the energy that is accumulated into the choke coil L1 (the inductor), the electromotive voltage of the choke coil L1 (the inductor) decreases. As a result, the rectifying side MOS-FET Q3 is eventually turned OFF (the above explanation is defined as the mode 2).

Thereafter, the flyback voltage is generated in the main transformer T1 again by the exciting energy that is accumulated so far in a direction (the non-dot side indicates the high potential) opposite to the arrow shown in FIG. 1 so that the mode 1 starts. Thereafter, the switching power supply device becomes in the self-excited oscillation state in which the mode 1 and the mode 2 are alternatively repeated.

Because the self-excited oscillation state is an uncontrolled state, there is a possibility that the voltage unexpectedly increases depending on the impedance between input DC voltage terminals (+Vin and −Vin). In this case, there is a possibility that the main switches Q1 and Q2 are broken because an unexpectedly increased voltage exceeds withstand voltages of drain-source voltages Vds between the drains and the sources of the main switches Q1 and Q2. Further, the voltage that is obtained by adding the electromotive voltage of the choke coil L1 (the inductor) and the output voltage is applied between the drain and the source (Vds) of the commutation side MOS-FET Q4 when the commutation side MOS-FET Q4 is turned OFF. Similarly, the above added voltage is also applied between the gate and the source (Vgs) of the rectifying side MOS-FET Q3. Therefore, there is a possibility that the rectifying side MOS-FET Q3 and the commutation side MOS-FET Q4 are broken because the added voltage exceeds respective withstand voltages thereof.

Further, there are the following other possible problems: generation of an abnormal loss by flowing an unexpected current; abnormal heat due to the abnormal loss; influence to other power sources as energy sources connected in parallel; and influence to a battery.

Output pulse waveforms of a conventional control circuit shown in FIG. 5 are used in a circuit diagram shown in FIG. 4 to conduct an experiment of self-excited oscillation. Specifically, a voltage Vext that is higher than an output voltage Vout of a power source is applied from outside by turning an external power source application switch S1 ON. When the voltage Vext is applied, the main switches Q1 and Q2 stop their operations so that the self-excited oscillation occurs. At this time, corresponding pulse waveforms are generated as shown in FIGS. 6 and 7. In FIGS. 6 and 7, both a peak upper limit value and a peak lower limit value of an inductor current IL flowing in a choke coil L1 (an inductor) are shifted downwardly. Further, a mean value becomes a negative value from a positive value. The above states show that because the electric power (an external power source) is supplied from the outside, the self-excited oscillation state starts.

SUMMARY

The present invention seeks to solve the problems explained above. An object of the present invention is to provide a switching power supply device that can prevent continuation of self-excited oscillation that is generated when a main switching element is turned OFF while a voltage (an energy source) exists at an output terminal +Vout. Specifically, the switching power supply device has a DC-DC converter unit that adopts a cascade forward configuration and a rectifier circuit corresponding to a synchronous rectifier circuit that is self-excitedly driven.

In order to achieve the above object, the present invention attempts to solve the above problems by using a configuration described below.

A switching power supply device according to one aspect of the present invention includes: a main transformer that has a primary-side main winding (Np) and a secondary-side main winding (Ns1); a first main switch (Q1) that is connected between a high potential terminal of an input direct current voltage source and the primary-side main winding; a second main switch (Q2) that is connected between a low potential terminal of the input direct current voltage source and the primary-side main winding; a control circuit configured to output a driving pulse signal from a driving pulse signal output terminal that is configured to synchronize the first and second main switches to perform an ON and OFF driving operation; a first rectifying device (CR2) having a first cathode and a first anode, the first cathode being connected to a first node connected between the first main switch and the primary-side main winding, the first anode being connected to the low potential terminal of the input direct current voltage source; a second rectifying device (CR1) having a second cathode and a second anode, the second anode being connected to a second node connected between the second main switch and the primary-side main winding, the second cathode being connected to the high potential terminal of the input direct current voltage source; a synchronous rectifier circuit; and a positive bias circuit configured to apply a positive bias to a control terminal of one of the first and second main switches so as to constantly turn the one of the first and second main switches ON. When the first and second main switches stop a switching operation while an output voltage exists between output terminals, the positive bias circuit applies the positive bias to the one of the first and second main switches.

In a switching power supply device according to the above aspect of the present invention, continuation of a self-excited oscillation that is generated when a main switching element is turned OFF can be prevented.

Further, in the power supply device according to the above aspect of the present invention, the power supply device further defines that the main transformer has an auxiliary winding (Ns2). The synchronous rectifier circuit includes a rectifying switch (Q3) and a commutation switch (Q4). The rectifying switch is configured to be driven by a forward voltage obtained via the secondary-side main winding of the main transformer. The commutation switch is configured to be driven by one of a first flyback voltage obtained via the secondary-side main winding of the main transformer and a second flyback voltage obtained via the auxiliary winding of the main transformer. The continuation of the self-excited oscillation that is generated when the main switching element is turned OFF can be prevented by using the above configurations.

Further, in the power supply device according to the above aspect of the present invention, the power supply device further includes: a first series circuit including a first capacitor (C10) and a first resistor (R11) that are connected between the driving pulse signal output terminal of the control circuit and the control terminal of the second main switch; a second resistor (R10) that is connected between a driving power supply of the control circuit and the control terminal of the second main switch; and a second series circuit of a first constant voltage element (CR10) and a third rectifying device (CR11), a cathode of the first constant voltage element being connected to the control terminal of the second main switch, and a cathode of the third rectifying device being connected to a reference potential (GND). Although conventional pulse signals of the control circuit are used, the continuation of the self-excited oscillation that is generated when the main switching element is turned OFF can be prevented by using the above configurations.

Further, in the power supply device according to the above aspect of the present invention, the power supply device further includes: a third series circuit including a fourth rectifying device (CR21) and a third resistor (R25) that are connected between the driving pulse signal output terminal of the control circuit and the control terminal of the second main switch, an anode of the fourth rectifying device being connected to the driving pulse signal output terminal; a fourth series circuit including a second constant voltage element (CR22) and a fourth resistor (R26) that are connected between a reference potential (GND) and a third node connected between the fourth rectifying device and the third resistor, an anode of the second constant voltage element being connected to the reference potential (GND); a P-channel bipolar transistor (Q21) in which a base being connected to a fourth node connected between the second constant voltage element and the fourth resistor, a collector being connected to the reference potential, and an emitter being connected to the control terminal of the second main switch; a second capacitor (C21) that is connected between the fourth node and the driving pulse signal output terminal of the control circuit; a fifth series circuit in which a fifth rectifying device (CR20), a fifth resistor (R21) and a third capacitor (C20) are serially connected in this order, the fifth series circuit being connected between the reference potential (GND) and the driving pulse signal output terminal of the control circuit, an anode of the fifth rectifying device being connected to the driving pulse signal output terminal; a N-channel bipolar transistor (Q20) in which a collector being connected to the base of the P-channel bipolar transistor via a sixth resistor (R24), an emitter being connected to the driving pulse signal output terminal of the control circuit, and a base being connected to a fifth node via a seventh resistor (R23), the fifth node being connected between the fifth resistor and the third capacitor, and an eighth resistor (R22) being connected between the base and the emitter of the N-channel bipolar transistor; a ninth resistor (R20) that is connected between the driving power supply of the control circuit and the control terminal of the second main switch; and a tenth resistor (R27) that is connected between the reference potential (GND) and the control terminal of the second main switch. Although conventional pulse signals of the control circuit are used, the continuation of the self-excited oscillation that is generated when the main switching element is turned OFF can be prevented by using the above configurations.

The switching power supply device according to the aspect of the present invention can prevent the continuation of the self-excited oscillation that is generated when the main switching element is turned OFF while a voltage (an energy source) exists at an output terminal. Specifically, the switching power supply device has a DC-DC converter unit that adopts a cascade forward configuration and a rectifier circuit corresponding to a synchronous rectifier circuit that is self-excitedly driven. The above effect is obtained without affecting a normal operation of the switching power supply device.

DESCRIPTION OF EXEMPLARY EMBODIMENTS

Figure 1:
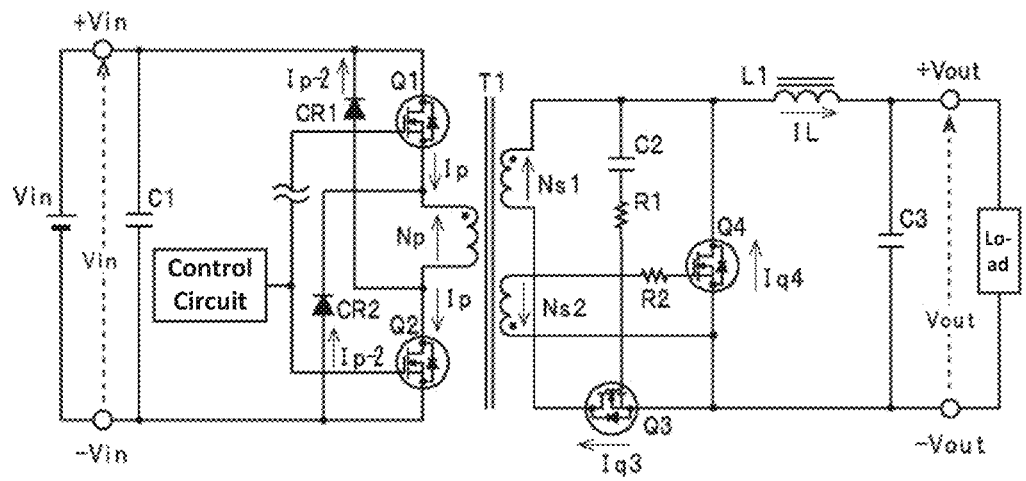
FIG. 1 is a circuit diagram that shows a conventional switching power supply device.
Figure 2:
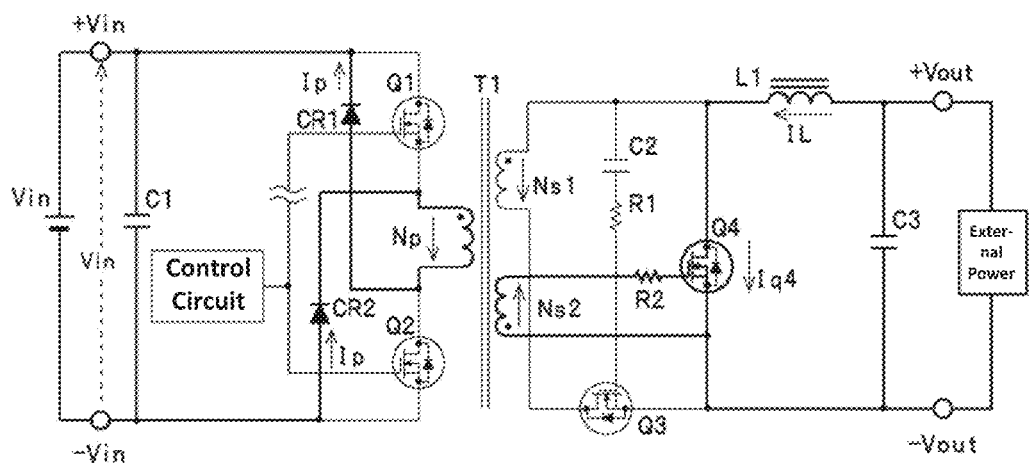
FIG. 2 is a circuit diagram that shows a mode 1 operation of a self-excited oscillation in a conventional switching power supply device.
Figure 3:
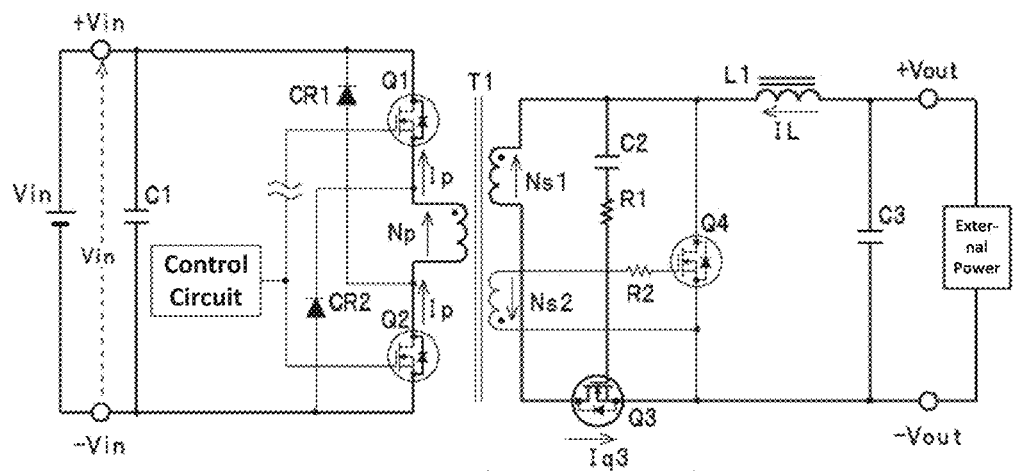
FIG. 3 is a circuit diagram that shows a mode 2 operation of a self-excited oscillation in a conventional switching power supply device.
Figure 8:
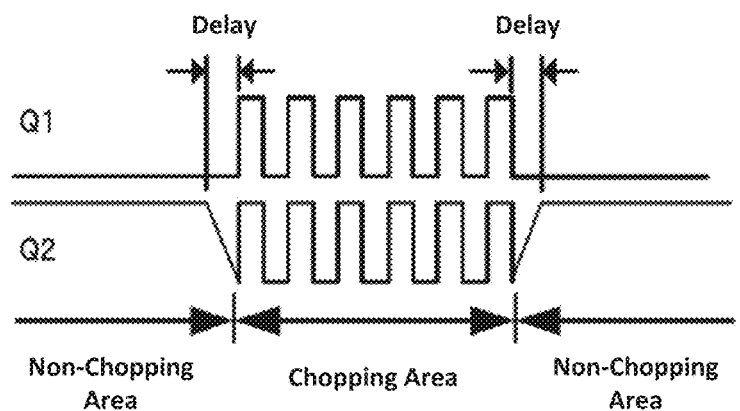
FIG. 8 is a waveform diagram that shows output pulses of a control circuit of a switching power supply device according to a first embodiment of the present invention.
Figure 9:
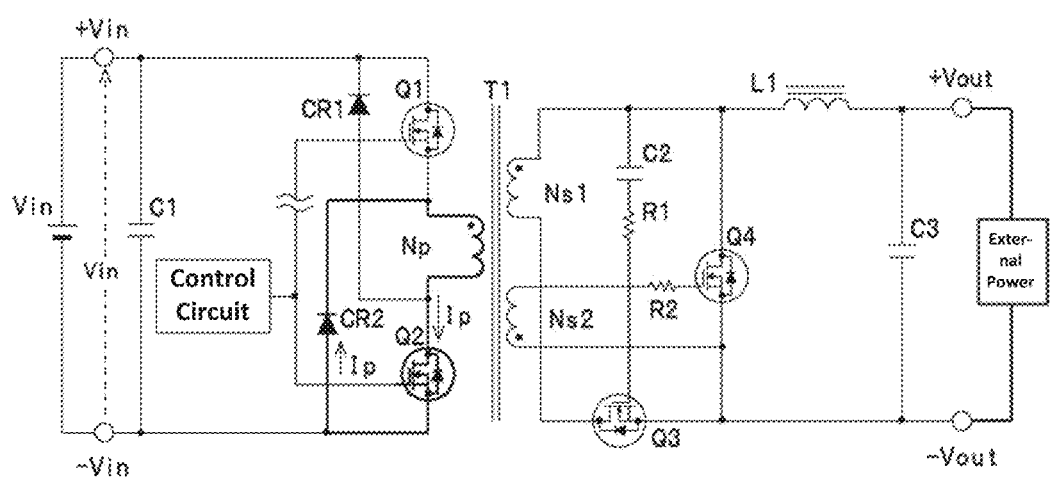
FIG. 9 is a circuit diagram that shows a principle of the switching power supply device according to the first embodiment of the present invention.

A switching power supply device according to an embodiment of the present invention will be explained below with reference to the drawings.
First Embodiment A circuit configuration of a switching power supply device according to a first embodiment of the present invention is the same as the circuit configuration of the conventional switching power supply device shown in FIG. 1 except a configuration of a control circuit. Specifically, only the output pulses of the control circuit of the first embodiment are different from the conventional switching power supply device shown in FIG. 1. FIG. 8 is a waveform diagram that shows the output pulses of the control circuit of the switching power supply device according to the first embodiment of the present invention. FIG. 9 is a circuit diagram that shows a principle of the switching power supply device according to the first embodiment of the present invention. The switching power supply device according to the first embodiment of the present invention is explained below with reference to FIGS. 8 and 9.

Specifically, the switching power supply device according to the first embodiment of the present invention is a main transformer T1 that isolates a primary side from a secondary side. Further, the main transformer T1 is configured with a primary-side main winding Np, a secondary-side main winding Ns1 and an auxiliary winding Ns2 that drives a commutation side MOS-FET Q4.

The polarities of the primary-side main winding Np, the secondary-side main winding Ns1 and the auxiliary winding Ns2 (in a secondary side) of the main transformer T1 are shown by dots in FIG. 9. Main switches Q1 and Q2 corresponds to switching elements such as MOS-FETs. The DC-DC converter unit adopts a cascade forward configuration. Therefore, a connection configuration between input DC voltage terminals +Vin and −Vin of an input DC voltage Vin is in the following order: the input DC voltage terminal +Vin on a high potential side, a drain terminal of the main switch Q1, a source terminal of the main switch Q1, a dot mark side of the primary-side main winding Np of the main transformer T1, a non-dot mark side of the primary-side main winding Np, a drain terminal of the main switch Q2, a source terminal of the main switch Q2 and the input DC voltage terminal −Vin on a low potential side. Further, an input capacitor C1 is connected between the input DC voltage terminals +Vin and −Vin.

Further, a cathode of a rectifying device CR2 is connected to the source terminal of the main switch Q1, and on the other hand, an anode is connected to the input DC voltage terminal −Vin on the low potential side of the input DC voltage Vin.

Further, an anode of a rectifying device CR1 is connected to the drain terminal of the main switch Q2, and on the other hand, a cathode is connected to the input DC voltage terminal +Vin on the high potential side of the input DC voltage Vin.

Because the main switches Q1 and Q2 perform the switching operations in synchronization with each other, the input DC voltage Vin is intermittently applied to the primary-side main winding Np of the main transformer T1. On the other hand, in the secondary side of the main transformer T1, a rectification smoothing circuit, which is configured with a rectifying side MOS-FET Q3, the commutation side MOS-FET Q4, a choke coil L1 and a capacitor C3, is connected to the secondary-side main winding Ns1.

A drain terminal of the commutation side MOS-FET Q4 and one end of the choke coil L1 are connected to a terminal on the dot mark side of the secondary-side main winding Ns1. Further, the other end of the choke coil L1 is connected to an output terminal +Vout. On the other hand, a drain terminal of the rectifying side MOS-FET Q3 is connected to a terminal on the non-dot mark side of the secondary-side main winding Ns1. Further, a source terminal of the rectifying side MOS-FET Q3, a source terminal of the commutation side MOS-FET Q4 and an output terminal −Vout are connected to each other. In addition, a capacitor C3 is connected between the output terminals +Vout and −Vout.

In the switching power supply device in which the DC-DC converter unit adopts the cascade forward configuration and the rectifier circuit corresponding to the synchronous rectifier circuit that is driven by the self-excited configuration explained above, when the switching operation of the main switching element is stopped for some reason while the voltage (the energy source) exists at the output terminal +Vout, there is a possibility in which a self-excited oscillation is continued. Specifically, because a flyback voltage that is generated at the primary-side main winding Np of the main transformer T1 induces a positive bias voltage at the auxiliary winding Ns2 for driving the commutation side MOS-FET Q4 (a switch) that is provided in the main transformer T1, the commutation side MOS-FET Q4 (a switch) is turned ON. As a result, a draw of an electric current (energy) from the output terminal +Vout triggers to get in a mode in which the self-excited oscillation is continued.

Therefore, the first embodiment according to the present invention avoids the above mode, in which the self-excited oscillation is continued, by using the driving pulse signals output from the control circuit. The first embodiment is explained in detail below with reference to FIGS. 8 and 9.

First, during a normal operation of the switching power supply device and the DC-DC converter unit, the control circuit outputs driving pulse signals, which make the output voltage stay in a predetermined voltage, to control terminals of the main switches Q1 and Q2. In this case, the driving pulse signal for the main switch Q2 corresponds to a pulse signal having a relative positive voltage with respect to a reference signal (GND). Further, the output of the driving pulse signals of the control circuit can be an output waveform that is defined in advance by a controller chip. In this case, when the main switches Q1 and Q2 stops the switching operations or the switching operations are stopped, i.e., the main switches Q1 and Q2 stop chopping operations by turning the main switches Q1 and Q2 ON and OFF or the chopping operations are stopped for some reason explained above, the above mode in which the self-excited oscillation is continued can be prevented by the following measures. Specifically, while a logic of the control terminal of the main switch Q1 stays in a low state, the main switch Q2 in the low potential side stays in an ON state by keeping a logic of the control terminal of the main switch Q2 is in a high state. As a result, the above features can achieved (see FIG. 8).

In the first embodiment of the present invention, since a DC bias is applied to the control terminal of the main switch Q2 in the low potential side, the main switch Q2 in the low potential side is maintained in the ON state at all times. Because the control terminals of the main switches Q1 and Q2 are driven as explained above, as shown in FIG. 9, the primary-side main winding Np and the main switch Q2 in the low potential side are forcibly short-circuited by a rectifying device CR2. A cathode of the rectifying device CR2 is connected to a node connected between the main switch Q1 in the high potential side and the primary-side main winding Np of the main transformer T1. At the same time, an anode of the rectifying device CR2 is connected to the reference signal (GND). Because the primary-side main winding Np is short-circuited, the voltage that drives the commutation side MOS-FET Q4 (switch) cannot be generated at the secondary-side auxiliary winding Ns2. Thus, the commutation side MOS-FET Q4 (switch) cannot be turned ON. As a result, because the electric current cannot be drawn from the output terminal +Vout, the self-excited oscillation cannot be continued so that the above problems are solved.

Further, the first embodiment of the present invention is not limited to the above. The main switch Q1 in the high potential side can also be maintained in the ON state at all times by applying the DC bias to the control terminal of the main switch Q1 in the high potential side. Specifically, when the main switches Q1 and Q2 stop the chopping operations by turning the main switches Q1 and Q2 ON and OFF or the chopping operations are stopped for some reason, the above mode in which the self-excited oscillation is continued can be prevented by the following measures. While a logic of the control terminal of the main switch Q2 stays in the low state, the main switch Q1 in the high potential side stays in the ON state by keeping a logic of the control terminal of the main switch Q1 in the high state. Because the control terminals of the main switches Q1 and Q2 are driven as explained above, as shown in FIG. 9, the primary-side main winding Np and the main switch Q1 in the high potential side are forcibly short-circuited by a rectifying device CR1. An anode of the rectifying device CR1 is connected to a node connected between the main switch Q2 in the low potential side and the primary-side main winding Np of the main transformer T1.

At the same time, a cathode of the rectifying device CR1 is connected to the input DC terminal +Vin (a high potential side) of the input DC voltage Vin. Because the primary-side main winding Np is short-circuited, the voltage that drives the commutation side MOS-FET Q4 (switch) cannot be generated at the secondary-side auxiliary winding Ns2. Thus, the commutation side MOS-FET Q4 (switch) cannot be turned ON. As a result, because the electric current cannot be drawn from the output terminal +Vout, the self-excited oscillation cannot be continued so that the above problems are solved.

Second Embodiment

Figure 10:
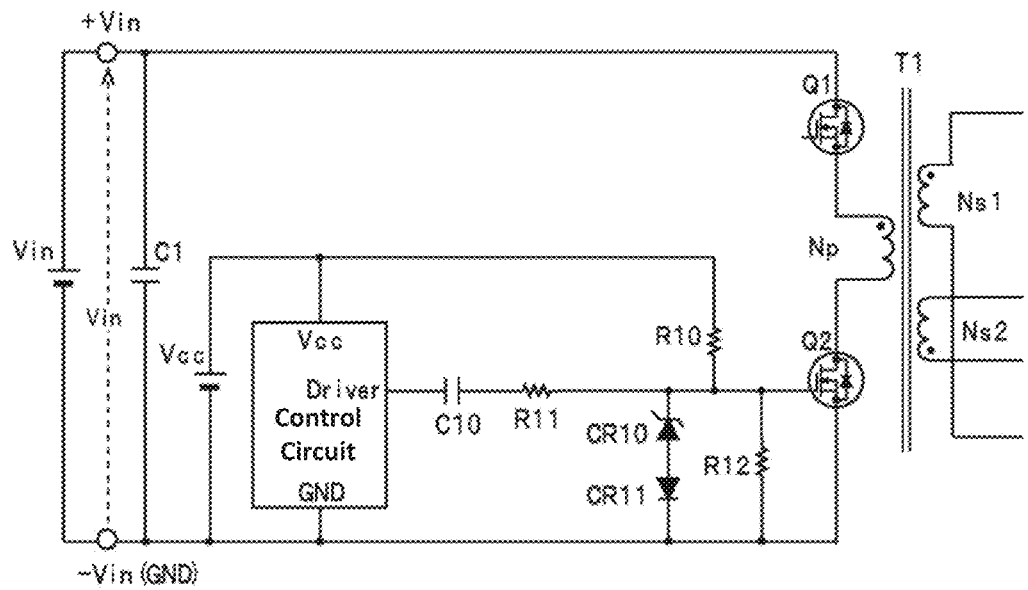
FIG. 10 is a circuit diagram that shows a switching power supply device according to a second embodiment of the present invention.

FIG. 10 is a circuit diagram that shows a second embodiment of a switching power supply device according to the present invention. In FIG. 10, elements such as rectifying devices CR1 and CR2 are omitted in order to understand the second embodiment easily.

As additional circuits of the switching power supply device according to the second embodiment compared with the first embodiment, the switching power supply device shown in FIG. 10 is further configured with a series circuit of a first capacitor (C10) and a first resistor (R11), a second resistor (R10), and a series circuit of a first constant voltage element (CR10) and a third rectifying device (CR11). Specifically, the series circuit of the first capacitor (C10) and the first resistor (R11) is connected between a driving pulse signal output terminal "Driver" of the control circuit and a control terminal of a second main switch Q2. The second resistor (R10) is connected between a driving power supply Vcc of the control circuit and the control terminal of the second main switch Q2. A cathode of the first constant voltage element (CR10) is connected to the control terminal of the second main switch Q2. Further, a cathode of the third rectifying device (CR11) is connected to the reference signal (GND).

Here, it is explained how the additional circuits prevent the problem in which the self-excited oscillation is generated with no effect on the normal operation. As explained in the background, when the DC-DC converter unit corresponds to the cascaded forward converter unit, because a driving circuit of the main switch Q1 in the high potential side is separated and insulated (floating) from a driving circuit of the main switch Q2 in the low potential side, there is no effect on the normal operation of the switching power supply device by adding the other circuits to the driving circuit of the main switch Q2 in the low potential side.

As explained above, when the switching power supply device and the DC-DC converter unit perform the normal operations, the driving pulse signals are output from the control circuit to the control terminals of the main switches Q1 and Q2 in order to make the output voltage stay in a predetermined voltage. In this case, the driving pulse signal for the main switch Q2 corresponds to a pulse signal having a relative positive voltage with respect to a reference signal (GND).

The normal operation of the switching power supply device according to the second embodiment of the present invention is explained below with reference to FIG. 10.

As shown in FIG. 10, when the first capacitor C10 is provided in series with a transmission path of the driving pulse signal to the main switch Q2 in the low potential side, the first capacitor C10 can transmit an AC voltage during the normal operation. However, because the first capacitor C10 cannot transmit a DC voltage during the normal operation, the DC voltage is converted to negative and positive pulse signals with respect to the reference signal (GND) as a reference. At this time, though a peak value of the driving pulse signal is changed between states in which the first capacitor C10 is inserted and is not inserted, this change can be prevented by suitably adjusting a capacitance of a capacitor that is inserted between the terminals of the main switch Q2.

In the second embodiment of the present invention, when the control circuit stops to output the driving pulse signals, the positive bias voltage is applied to the control terminal of the main switch Q2 in the low potential side from the driving power supply Vcc of the control circuit at all times. Thus, the main switch Q2 is maintained in the ON state at all times. Because the main switch Q2 in the low potential side is maintained in the ON state at all times, in the same manner as explained in regards to the first embodiment in FIG. 9, the primary-side main winding Np and the main switch Q2 in the low potential side are forcibly short-circuited by a rectifying device CR2. The cathode of the rectifying device CR2 is connected to the node connected between the main switch Q1 in the high potential side and the primary-side main winding Np of the main transformer T1. At the same time, the anode of the rectifying device CR2 is connected to the reference signal (GND). Because the primary-side main winding Np is short-circuited, the voltage that drives the commutation side MOS-FET Q4 (switch) cannot be generated at the secondary-side auxiliary winding Ns2. Thus, the commutation side MOS-FET Q4 (switch) cannot be turned ON. As a result, because the electric current cannot be drawn from the output terminal +Vout, the self-excited oscillation cannot be continued so that the above problems are solved. Further, in FIGS. 10-14, the elements such as the rectifying devices CR1 and CR2 are omitted in order to understand the embodiments easily.

According to the second embodiment of the present invention, the problem, in which the self-excited oscillation is continuously generated, can be prevented with no effect on the normal operation of the switching power supply device. Further, in the second embodiment of the present invention, because the general output pulse signals of the control circuit can be used without any modification, the self-excited oscillation can be suppressed only by adding a small number of circuit elements without changing the configuration of the control circuit.

Third Embodiment

Figure 11:
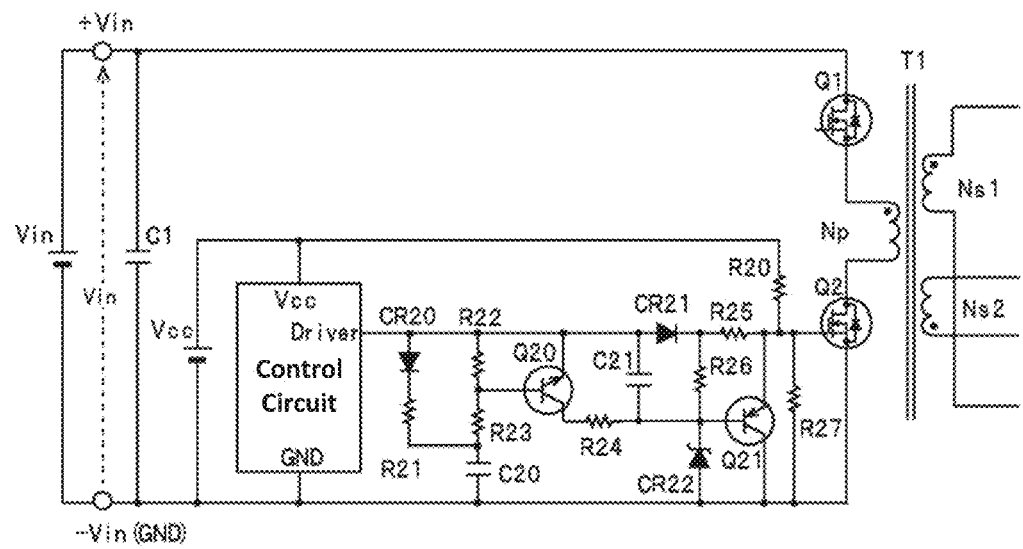
FIG. 11 is a circuit diagram that shows a switching power supply device according to a third embodiment of the present invention.

FIG. 11 is a circuit diagram that shows a switching power supply device according to a third embodiment of the present invention.

As additional circuits of the switching power supply device according to the third embodiment compared with the first embodiment, the switching power supply device shown in FIG. 11 is further configured with the following elements: a series circuit of a fourth rectifying device (CR21) and a third resistor (R25) that are connected between a driving pulse signal output terminal and a control terminal of a second main switch Q2, an anode of the fourth rectifying device (CR21) being connected to the driving pulse signal output terminal; a series circuit of a second constant voltage element (CR22) and a fourth resistor (R26) that are connected between a reference potential (GND) and a node connected between the fourth rectifying device (CR21) and the third resistor (R25), and an anode of the second constant voltage element (CR22) being connected to the reference potential (GND); a PNP type (p-channel) bipolar transistor (Q21) in which a base being connected to a node connected between the second constant voltage element (CR22) and the fourth resistor (R26), a collector being connected to the reference potential (GND), and an emitter being connected to the control terminal of the second main switch Q2; a second capacitor (C21) that is connected between the node, which is connected between the second constant voltage element (CR22) and the fourth resistor (R26), and the driving pulse signal output terminal of the control circuit; a series circuit in which a fifth rectifying device (CR20), a fifth resistor (R21) and a third capacitor (C20) are serially connected in this order, the series circuit being connected between the reference potential (GND) and the driving pulse signal output terminal of the control circuit, an anode of the fifth rectifying device (CR20) being connected to the driving pulse signal output terminal; an NPN type (N-channel) bipolar transistor (Q20) in which a collector being connected to the base of the PNP type (P-channel) bipolar transistor via a sixth resistor (R24), an emitter being connected to the driving pulse signal output terminal of the control circuit, and a base being connected to a node via a seventh resistor (R23), the node being connected between the fifth resistor (R21) and the third capacitor (C20), and an eight resistor (R22) being connected between the base and the emitter of the NPN type (N-channel) bipolar transistor; a ninth resistor (R20) that is connected between the driving power supply Vcc of the control circuit and the control terminal of the second main switch Q2; and a tenth resistor (R27) that is connected between the reference potential (GND) and the control terminal of the second main switch Q2.

Figure 13:
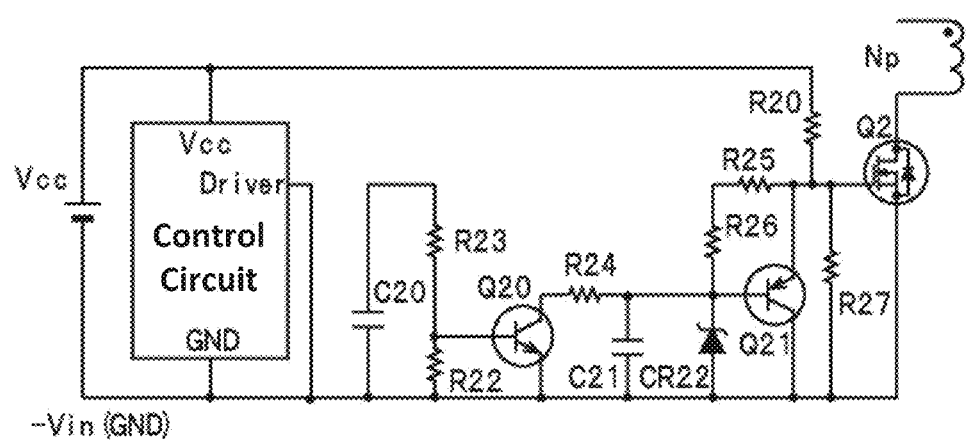
FIG. 13 is a representative circuit diagram that shows the switching power supply device according to the third embodiment of the present invention. Specifically, the representative circuit diagram corresponds to a case in which a logic of a driving pulse signal of a control circuit of the switching power supply device is in a low state (logic low).
Figure 14:
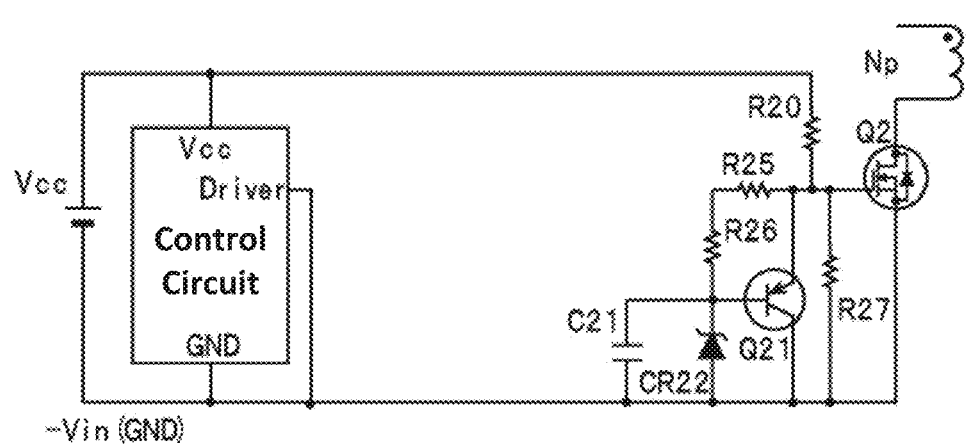
FIG. 14 is a representative circuit diagram that shows the switching power supply device according to the third embodiment of the present invention. Specifically, the representative circuit diagram corresponds to a case in which while an output terminal "Driver" of the driving pulse signal of the control circuit of the switching power supply device is in a low impedance state, the control circuit stops generating the driving pulse signal.

The normal operation of the switching power supply device according to the third embodiment of the present invention is explained below with reference to FIGS. 12-14.

Figure 12:
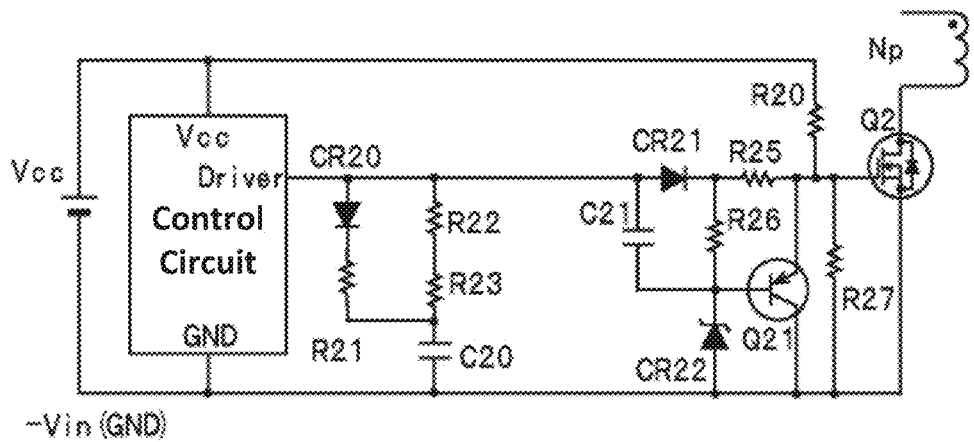
FIG. 12 is a representative circuit diagram that shows the switching power supply device according to the third embodiment of the present invention. Specifically, the representative circuit diagram corresponds to a case in which a logic of a driving pulse signal of a control circuit of the switching power supply device is in a high state (logic high).

When the power supply device according to the third embodiment of the present invention is in a normal operation state and when a logic of the driving pulse signal is in a high state (logic high), related circuits are equivalently shown in FIG. 12. At this time, the driving pulse signal is applied to the control terminal of the main switch Q2 in the low potential side via the fourth rectifying device CR21 and the third resistor R25. At the same time, the third capacitor C20 is charged via the series circuit of the fifth rectifying device CR20 and the fifth resistor R21 and the series circuit of the eighth resistor R22 and the seventh resistor R23. Further, the second capacitor C21 is charged by a differential voltage between the high state (logic high) of the driving pulse signal and a clamp voltage of the second constant voltage element CR22 in a state in which the cathode side of the second constant voltage element CR22 has a high potential.

When a logic of the driving pulse signal is in a low state (logic low) in the normal operation state, the driving pulse signal output terminal "Driver" of the control circuit becomes a low impedance state. In this case, related circuits are equivalently shown in FIG. 13. First, because of a stored charge of the second capacitor C21, the control terminal of the main switch Q2 in the low potential side becomes in a reverse bias state so that the main switch Q2 is immediately turned OFF. Further, because of a stored charge of the third capacitor C20, a base current flows into a base of the NPN type (N-channel) bipolar transistor Q20 via the seventh resistor R23 so that the NPN type (N-channel) bipolar transistor Q20 is turned ON. Next, because the collector of the NPN type (N-channel) bipolar transistor Q20 draws a base current of the PNP type (P-channel) bipolar transistor Q21 via the sixth resistor R24, the PNP type (N-channel) bipolar transistor Q21 is turned ON. As a result, because the control terminal of the main switch Q2 in the low potential side is short-circuited by the PNP type (P-channel) bipolar transistor Q21, the main switch Q2 stays in an OFF state.

As explained above, during the normal operation, the switching power supply device operates by the driving pulse signals from the control circuit without problems.

Next, in the third embodiment of the present invention, when the control circuit stops to output the driving pulse signals while the driving pulse signal output terminal "Driver" of the control circuit is in a low impedance state, as time elapses, the stored charge of the third capacitor C20 is consumed as the base current that turns the NPN type (N-channel) bipolar transistor Q20 ON. When the NPN type (N-channel) bipolar transistor Q20 cannot stay in the ON state, related circuits are equivalently shown in FIG. 14. In this state, because the positive bias voltage is applied to the control terminal of the main switch Q2 in the low potential side from the driving power supply Vcc of the control circuit at all times, the main switch Q2 in the low potential side stays in the ON state. A potential of the control terminal of the main switch Q2 is clamped by the sum of a base-emitter voltage of the PNP type (P-channel) bipolar transistor Q21 and a clamp voltage of the second constant voltage element CR22. Therefore, because the main switch Q2 in the low potential side stays in the ON state at all times, in the same manner as explained in regards to the first embodiment in FIG. 9, the primary-side main winding Np and the main switch Q2 in the low potential side are forcibly short-circuited by a rectifying device CR2. The cathode of the rectifying device CR2 is connected to the node connected between the main switch Q1 in the high potential side and the primary-side main winding Np of the main transformer T1. At the same time, the anode of the rectifying device CR2 is connected to the reference signal (GND). Because the primary-side main winding Np is short-circuited, the voltage that drives the commutation side MOS-FET Q4 (switch) cannot be generated at the secondary-side auxiliary winding Ns2. Thus, the commutation side MOS-FET Q4 (switch) cannot be turned ON. As a result, because the electric current cannot be drawn from the output terminal +Vout, the self-excited oscillation cannot be continued so that the above problems are solved. As explained above, according to the third embodiment of the present invention, the problem, in which the self-excited oscillation is continuously generated, can be prevented with no effect on the normal operation of the switching power supply device. Further, in the third embodiment of the present invention, because the general output pulse signals of the control circuit can be used without any modification, the self-excited oscillation can be suppressed only by adding a small number of circuit elements without changing the configuration of the control circuit.

Figure 4:
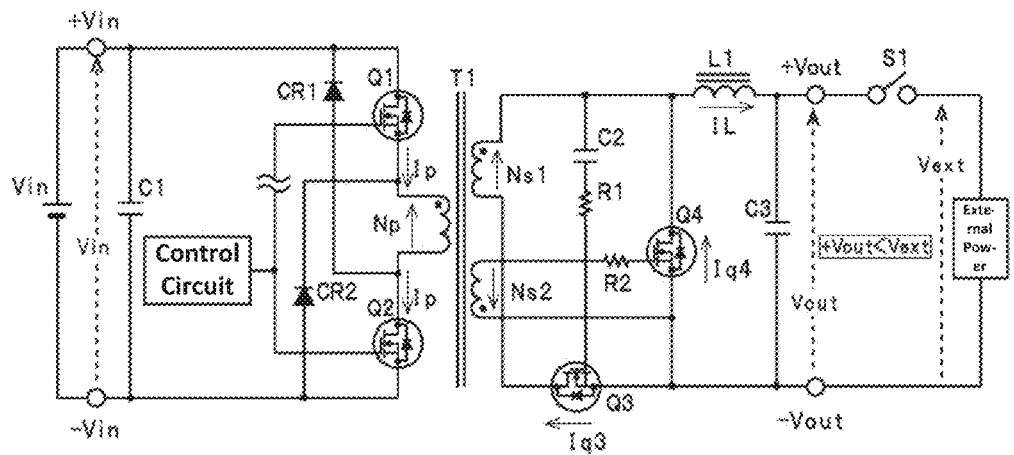
FIG. 4 is a circuit diagram for conducting an experiment of a self-excited oscillation.
Figure 5:
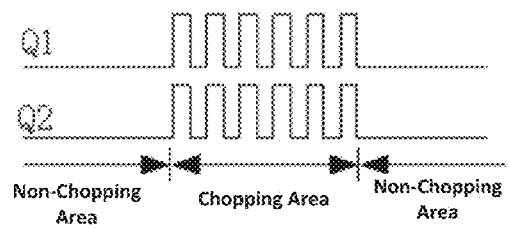
FIG. 5 is a waveform diagram that shows an output pulse of a conventional control circuit.
Figure 6:
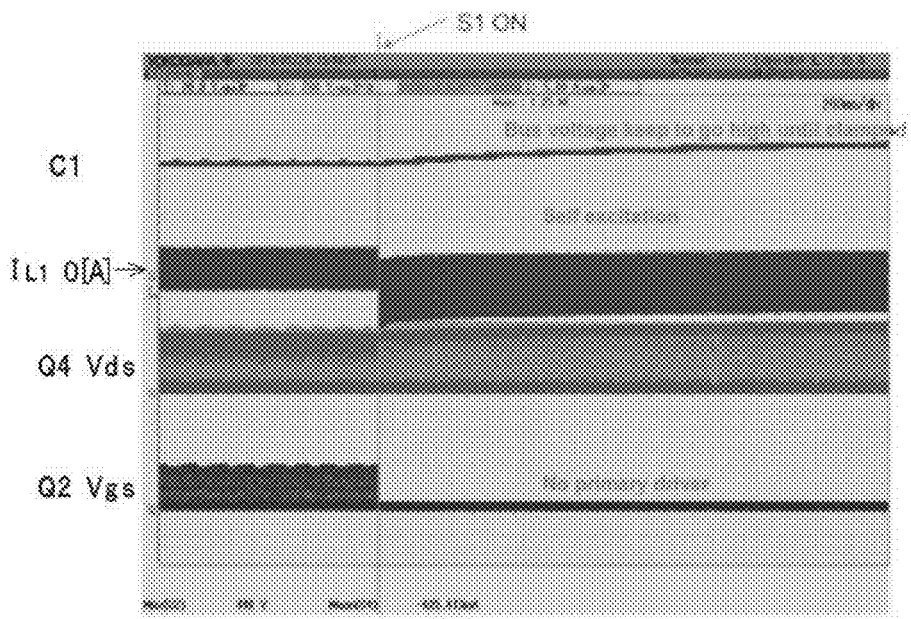
FIG. 6 is a waveform diagram during a self-excited oscillation of a conventional switching power supply device.
Figure 7:
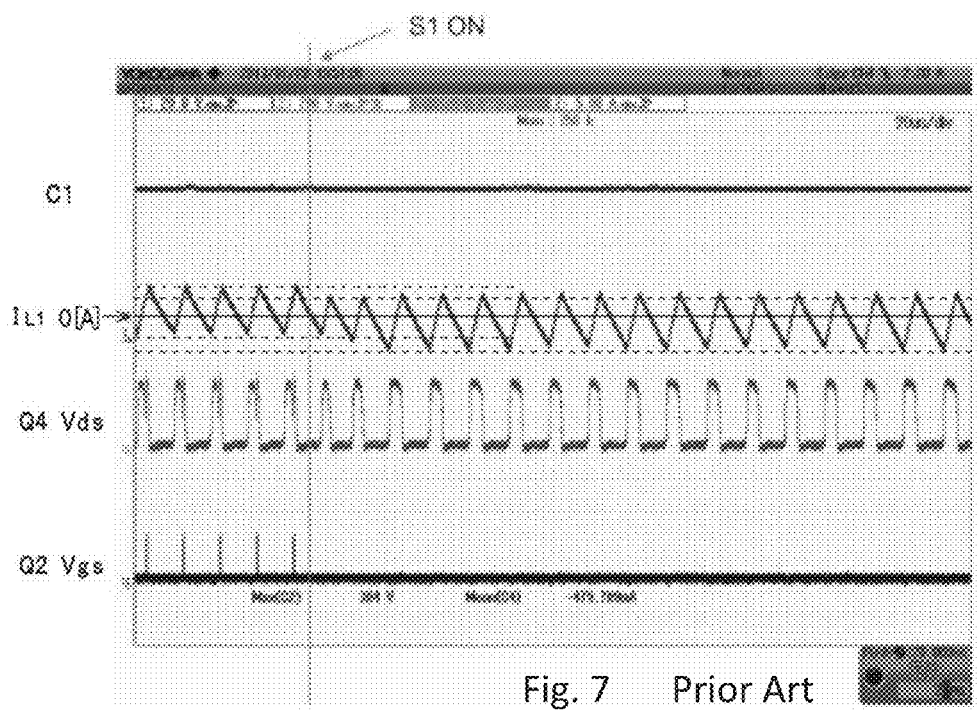
FIG. 7 is an enlarged waveform diagram during the self-excited oscillation of the conventional switching power supply device shown in FIG. 6.
Figure 15:
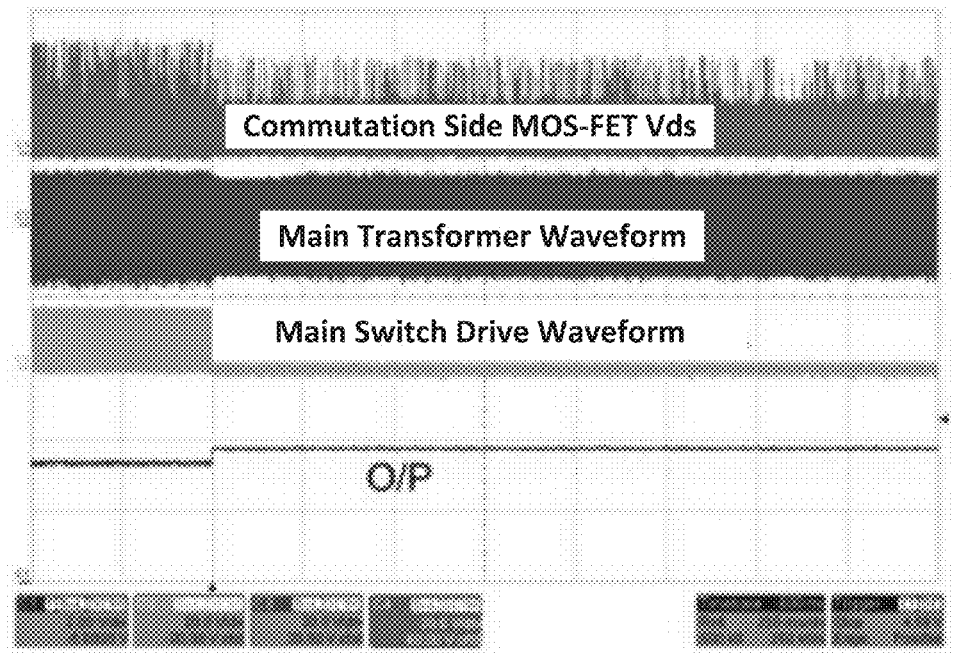
FIG. 15 is a waveform diagram of the conventional switching power supply device. Specifically, the waveform diagram corresponds to a case in which a main switch stops its operation.
Figure 16:
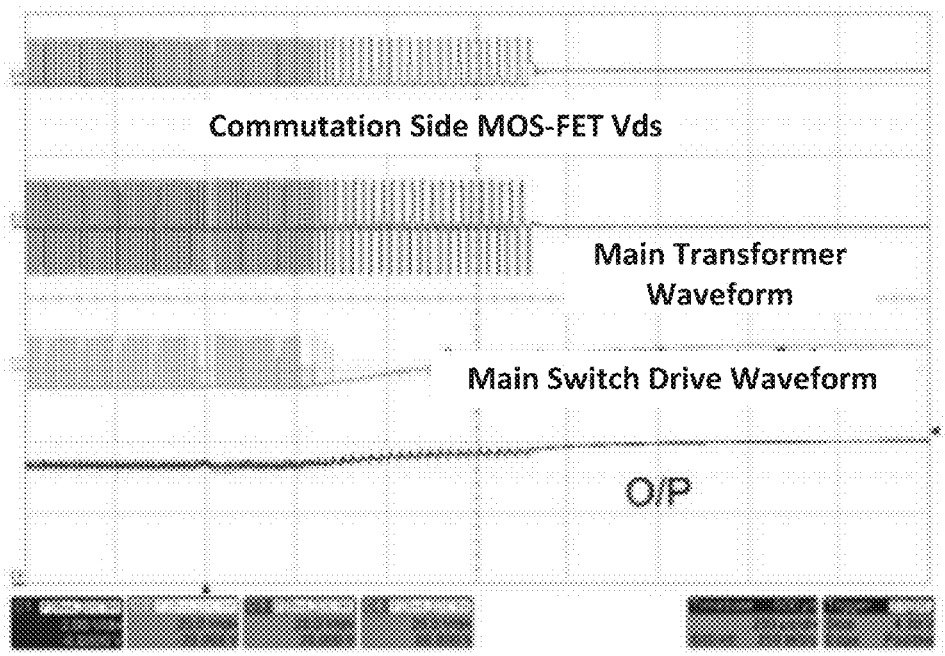
FIG. 16 is a waveform diagram of a switching power supply device according to an embodiment of the present invention. Specifically, the waveform diagram corresponds to a case in which a main switch stops its operation.

According to the first through third embodiments of the present invention explained above, substantially the same effects can be obtained. The effects of the operations are shown in the FIGS. 15 and 16. FIG. 15 is a waveform diagram of the conventional switching power supply device. Specifically, the waveform diagram corresponds to a case in which the self-excited oscillation is continuously generated while a main switch stops its operation by using the conventional control driving pulse signals. FIG. 16 is a waveform diagram of the switching power supply device according to the embodiments of the present invention. Specifically, the waveform diagram corresponds to a case in which the self-excited oscillation does not continue while a main switch stops its operation. In FIG. 16, "O/P" indicates an output (an output voltage) of the switching power supply device according to the embodiment of the present invention. An external power source, in which an output voltage is higher than an output voltage of the switching power supply device explained above, is adjacently connected to the output terminals +Vout and −Vout of the switching power supply device via a switch (refer to FIG. 4). Further, the waveforms shown in FIG. 16 are collected before and after turning ON the switch. Because the switching power supply device that have a capacity at the output terminals +Vout and −Vout, the voltage is gradually shifted to a high setting voltage of the external power source. Because an output voltage setting value of the switching power supply device is lower than the external power source, according to the unexpected increase of the output voltage, the switching power supply device continues to perform the operation while narrowing a pulse width. Eventually, because the pulse width becomes "0," the switching power supply device is supposed to be in a stop state. However, in the switching power supply that includes a self-excited synchronous rectifier circuit and that has the conventional driving pulse signals (FIG. 5), the self-excited oscillation is generated based on energy from the external power supply device vis the power supply output terminals. In this case, it is clear that the self-excited oscillation is generated, because FIG. 15 shows that a Vds waveform of a commutation side MOS-FET and a drive waveform of a main transformer respectively continue oscillations during a period in which a drive waveform of the main switch in a stop state.

In FIG. 16, the same waveforms of the switching power supply device according to an embodiment of the present invention are obtained under the same conditions as FIG. 15. Further, a time base in FIG. 15 corresponds to 200 mS/div. A time base in FIG. 16 corresponds to 200 μS/div. Therefore, there is one thousand times difference between these time bases. The waveform in FIG. 16 shows that the switching power supply device which has a low output voltage setting value continues to perform the operation while gradually narrowing a pulse width according to an increase of a composite output voltage. Thereafter, because the pulse width finally becomes "0," the switching power supply device is in a drive stop state. The above states are understood based on the waveforms shown in FIG. 16. However, in a process toward the drive stop state, a main switch driving waveform is gradually increased based on the disclosures explained in the above embodiments according to the present invention. As a result, though the self-excited oscillation can be found during a short period after the driving operation stops, the waveform shows that the self-excited oscillation is stopped in accordance with the increase of the main switch driving waveform. As shown in FIG. 16, according to the present invention, the problem, in which the self-excited oscillation is continuously generated, can be prevented with no effect on the normal operation of the switching power supply device.

The present invention has been explained with reference to the drawings and the embodiments above. However, the present invention should not be limited to the embodiments explained above. For instance, in the embodiments explained above, the commutation side MOS-FET Q4 is driven by the flyback voltage that is obtained by the auxiliary winding provided independently in the main transformer explained above. However, the commutation side MOS-FET Q4 can also be driven by a flyback voltage that is obtained by the secondary-side main winding itself. In this case, in regards to both the driving of the rectifying side MOS-FET Q3 and the driving of the commutation side MOS-FET Q4, because they (Q3 and Q4) are connection to the secondary-side main winding, the auxiliary winding can also be omitted.

The switching power supply device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A switching power supply device, comprising:
    a main transformer that has a primary-side main winding and a secondary-side main winding;
    a first main switch that is connected between a high potential terminal of an input direct current voltage source and the primary-side main winding;
    a second main switch that is connected between a low potential terminal of the input direct current voltage source and the primary-side main winding;
    a control circuit configured to output a driving pulse signal from a driving pulse signal output terminal that is configured to synchronize the first and second main switches to perform an ON and OFF driving operation;
    a first rectifying device having a first cathode and a first anode, the first cathode being connected to a first node connected between the first main switch and the primary-side main winding, the first anode being connected to the low potential terminal of the input direct current voltage source;
    a second rectifying device having a second cathode and a second anode, the second anode being connected to a second node connected between the second main switch and the primary-side main winding, the second cathode being connected to the high potential terminal of the input direct current voltage source;
    a synchronous rectifier circuit; and
    a positive bias circuit configured to apply a positive bias to a control terminal of one of the first and second main switches so as to turn the one of the first and second main switches ON, wherein
    when the first and second main switches stop a switching operation while an output voltage exists between output terminals, the positive bias circuit applies the positive bias to only the one of the first and second main switches.

2. The switching power supply device according to claim 1, wherein
    the main transformer has an auxiliary winding,
    the synchronous rectifier circuit includes a rectifying switch and a commutation switch,
    the rectifying switch is configured to be driven by a forward voltage obtained via the secondary-side main winding of the main transformer, and
    the commutation switch is configured to be driven by one of a first flyback voltage obtained via the secondary-side main winding of the main transformer and a second flyback voltage obtained via the auxiliary winding of the main transformer.

3. The switching power supply device according to claim 1, further comprising:
    a first series circuit including a first capacitor and a first resistor that are connected between the driving pulse signal output terminal of the control circuit and the control terminal of the second main switch;
    a second resistor that is connected between a driving power supply of the control circuit and the control terminal of the second main switch; and
    a second series circuit of a first constant voltage element and a third rectifying device, a cathode of the first constant voltage element being connected to the control terminal of the second main switch, and a cathode of the third rectifying device being connected to a reference potential.

4. The switching power supply device according to claim 1, further comprising:
- a third series circuit including a fourth rectifying device and a third resistor that are connected between the driving pulse signal output terminal of the control circuit and the control terminal of the second main switch, an anode of the fourth rectifying device being connected to the driving pulse signal output terminal;
- a fourth series circuit including a second constant voltage element and a fourth resistor that are connected between a reference potential and a third node connected between the fourth rectifying device and the third resistor, an anode of the second constant voltage element being connected to the reference potential;
- a P-channel bipolar transistor having:
  - a base connected to a fourth node connected between the second constant voltage element and the fourth resistor,
  - a collector connected to the reference potential, and
  - an emitter connected to the control terminal of the second main switch;
- a second capacitor that is connected between the fourth node and the driving pulse signal output terminal of the control circuit;
- a fifth series circuit in which a fifth rectifying device, a fifth resistor and a third capacitor are serially connected in this order, the fifth series circuit being connected between the reference potential and the driving pulse signal output terminal of the control circuit, an anode of the fifth rectifying device being connected to the driving pulse signal output terminal;
- a N-channel bipolar transistor having:
  - a collector connected to the base of the P-channel bipolar transistor via a sixth resistor,
  - an emitter connected to the driving pulse signal output terminal of the control circuit, and
  - a base connected to a fifth node via a seventh resistor, the fifth node being connected between the fifth resistor and the third capacitor, and an eighth resistor being connected between the base and the emitter of the N-channel bipolar transistor;
- a ninth resistor that is connected between the driving power supply of the control circuit and the control terminal of the second main switch; and
- a tenth resistor that is connected between the reference potential and the control terminal of the second main switch.

* * * * *